US010102835B1

(12) United States Patent
Shah et al.

(10) Patent No.: US 10,102,835 B1
(45) Date of Patent: Oct. 16, 2018

(54) SENSOR DRIVEN ENHANCED VISUALIZATION AND AUDIO EFFECTS

(71) Applicant: Intel Corporation, Santa Clara, CA (US)

(72) Inventors: Saurin Shah, Portland, OR (US); Swarnendu Kar, Hillsboro, OR (US); Lakshman Krishnamurthy, Portland, OR (US); Arthur D Webb, Santa Clara, CA (US); Manan Goel, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/581,957

(22) Filed: Apr. 28, 2017

(51) Int. Cl.
| | | |
|---|---|---|
| *G10H 1/00* | (2006.01) | |
| *G06F 3/01* | (2006.01) | |
| *G06F 3/16* | (2006.01) | |
| *G06T 11/60* | (2006.01) | |

(52) U.S. Cl.
CPC ........... *G10H 1/0008* (2013.01); *G06F 3/017* (2013.01); *G06F 3/165* (2013.01); *G06T 11/60* (2013.01); *G10H 1/0066* (2013.01); *G10H 1/0083* (2013.01); *G10H 2220/185* (2013.01); *G10H 2220/191* (2013.01); *G10H 2220/201* (2013.01); *G10H 2220/206* (2013.01); *G10H 2220/365* (2013.01)

(58) Field of Classification Search
CPC .. G10H 1/0066; G10H 1/0083; G10H 1/0008; G06F 3/017
USPC .......................................................... 84/615
See application file for complete search history.

(56) References Cited

U.S. PATENT DOCUMENTS

| | | | | | |
|---|---|---|---|---|---|
| 4,341,140 | A | * | 7/1982 | Ishida | ................... G10H 1/0091 84/477 B |
| 4,968,877 | A | * | 11/1990 | McAvinney | ......... G10H 1/0553 250/221 |
| 5,290,964 | A | * | 3/1994 | Hiyoshi | ................... G06F 3/014 84/600 |
| 5,414,256 | A | * | 5/1995 | Gurner | .................... A63F 13/06 250/221 |
| 5,475,214 | A | * | 12/1995 | DeFranco | ............... A63F 13/06 250/221 |
| 6,028,594 | A | * | 2/2000 | Inoue | .................... G06F 3/0416 345/159 |
| 6,222,465 | B1 | * | 4/2001 | Kumar | .................... G06F 3/017 341/20 |

(Continued)

FOREIGN PATENT DOCUMENTS

CN            102024140          4/2011

OTHER PUBLICATIONS

Kanke, Hiroyuki, "Airstic Drum: a Drumstick for Integration of Real Virtual Drums", (2012), 13 pgs.

*Primary Examiner* — David Warren
(74) *Attorney, Agent, or Firm* — Schwegman Lundberg & Woessner, P.A.

(57) ABSTRACT

Systems and methods may be used to provide effects corresponding to movement of instrument objects or other objects. A method may include receiving sensor data from an object based on movement of the object, recognizing a gesture from the sensor data, and determining an effect, such as a visualization or audio effect corresponding to the gesture. The method may include causing the effect to be output in response to the determination.

25 Claims, 7 Drawing Sheets

(56) References Cited

U.S. PATENT DOCUMENTS

| | | | | |
|---|---|---|---|---|
| RE37,654 E * | 4/2002 | Longo | ............... | G10H 1/02 84/600 |
| 6,388,183 B1 * | 5/2002 | Leh | ............... | G10H 1/0008 84/645 |
| 6,492,775 B2 * | 12/2002 | Klotz | ............... | G10H 1/00 250/221 |
| 6,960,715 B2 * | 11/2005 | Riopelle | ............... | G10H 1/00 84/600 |
| 7,723,604 B2 * | 5/2010 | Bang | ............... | G10H 1/0041 84/615 |
| 8,198,526 B2 * | 6/2012 | Izen | ............... | G10H 3/146 84/743 |
| 8,759,659 B2 | 6/2014 | Tabata | | |
| 9,018,508 B2 * | 4/2015 | Sakurai | ............... | G10H 5/00 700/94 |
| 9,360,206 B2 * | 6/2016 | Hiss | ............... | G10D 13/00 |
| 9,720,509 B2 * | 8/2017 | Takahagi | ............... | G06F 3/017 |
| 9,799,315 B2 * | 10/2017 | Hardi | ............... | G10H 3/146 |
| 2001/0035087 A1 * | 11/2001 | Subotnick | ............... | G10H 1/0008 84/600 |
| 2003/0159567 A1 * | 8/2003 | Subotnick | ............... | G06F 3/017 84/626 |
| 2008/0122786 A1 * | 5/2008 | Pryor | ............... | A63F 13/02 345/156 |
| 2010/0009746 A1 * | 1/2010 | Raymond | ............... | A63F 13/24 463/31 |
| 2011/0102568 A1 * | 5/2011 | Bonnet | ............... | A61B 5/1114 348/77 |
| 2011/0239847 A1 * | 10/2011 | Small | ............... | G10H 1/0083 84/723 |
| 2012/0144979 A1 * | 6/2012 | Tansley | ............... | G10H 1/0066 84/645 |
| 2013/0118339 A1 * | 5/2013 | Lee | ............... | G10H 1/32 84/725 |
| 2013/0228062 A1 * | 9/2013 | Tabata | ............... | G10H 1/0008 84/602 |
| 2013/0239780 A1 * | 9/2013 | Tabata | ............... | G10H 1/0008 84/602 |
| 2013/0239785 A1 * | 9/2013 | Tabata | ............... | G10H 1/0008 84/609 |
| 2015/0356957 A1 * | 12/2015 | Piccionelli | ............... | G10H 3/146 84/422.4 |
| 2016/0203806 A1 * | 7/2016 | Hardi | ............... | G10D 13/003 84/600 |
| 2017/0103742 A1 * | 4/2017 | Piccionelli | ............... | G10H 3/146 |
| 2017/0229103 A1 * | 8/2017 | Benner, Jr. | ............... | G10D 13/003 |

* cited by examiner

SENSOR DRIVEN ENHANCED VISUALIZATION AND AUDIO EFFECTS

BACKGROUND

Playing and listening to live music has been captivating humans for millennia. Traditionally, live performances featured little in the way of visual effects. More recently, live performances have been augmented by video, lighting effects, pyrotechnics, and props. While these effects have been entertaining, they do not let the audience experience the musician's point of view. These effects are further limited in that they are not controllable by the musician during the performance.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
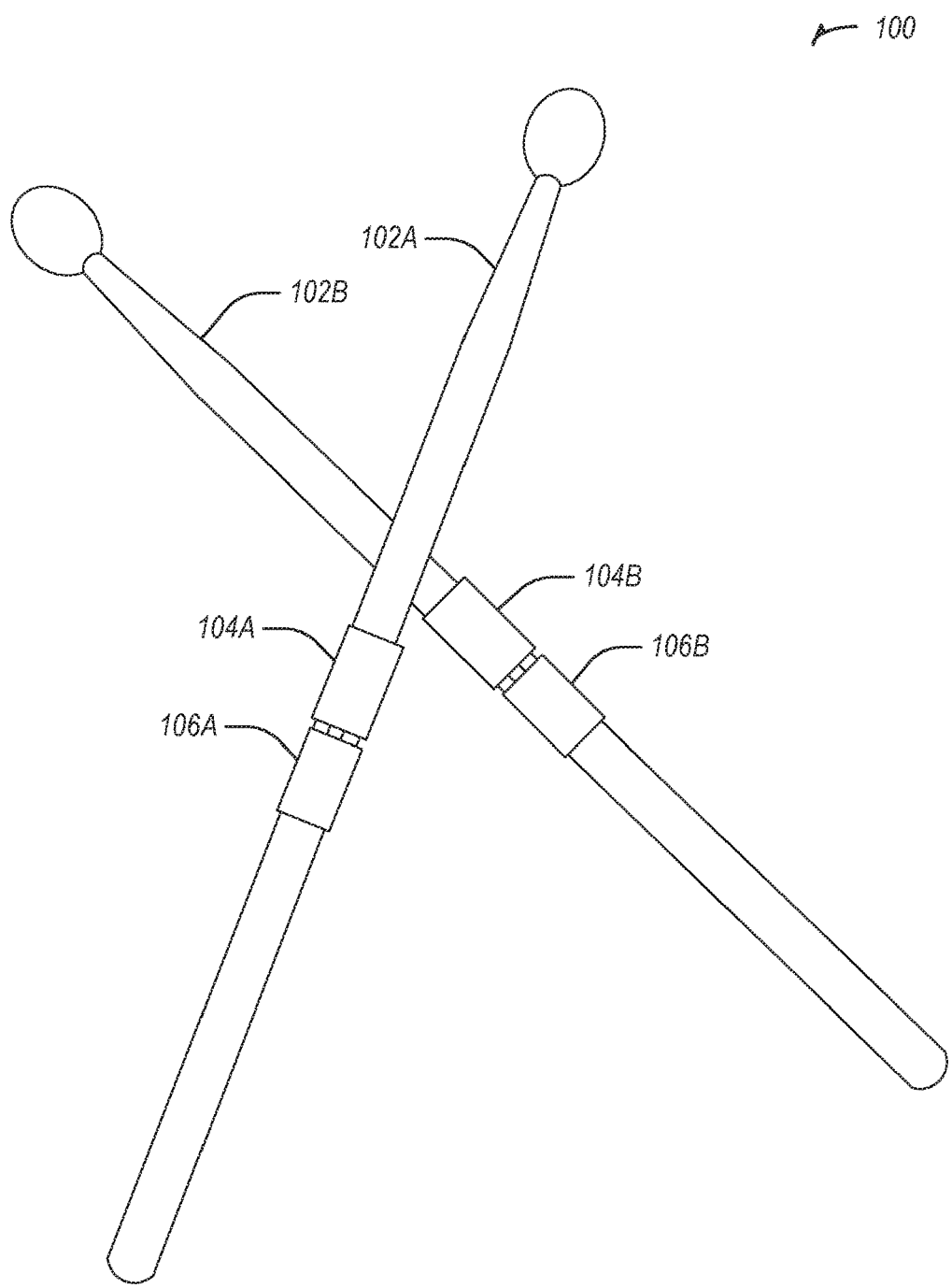
FIG. 1 illustrates a pair of drum sticks for creating visualization or audio effects in accordance with some embodiments.

Systems and methods for providing virtual instrument visualization effects corresponding to movement of physical objects, such as drum sticks, a violin bow, a guitar pick, a conductor baton, or the like are described herein. The systems and methods described herein are used to augment and enrich experiences from traditional musical instruments by communicating with a device to perform motion sensing, gesture detection, and wireless communication.

The systems and methods described herein are used for music performance with enhanced experiences. Motion sensing is added to one or more musical instruments, such as a drum stick, a violin/viola/cello bow, a guitar pick, an end of a guitar (e.g., headstock), a conductor's baton, or the like. The musical experience of an artist or audience may be enhanced, and may include real instruments or virtual instruments, such as those used in virtual reality (VR) or augmented reality (AR) systems.

Some traditional systems may use one or more cameras to track musical instruments. An issue with these traditional systems is that they may be occluded by a player's own hand. The presently described systems and methods use a sensor, such as a nine-axis gyroscope and accelerometer, which may measure rotation, location, or orientation. The sensor may be used without a camera, which allows uninterrupted rotation, location, or orientation information to be available while a user plays, without concern for a camera line of sight.

In an example, the systems and methods described herein provide audible and visual feedback to be played and displayed, respectively, when an action, motion, or gesture occurs at a device (e.g., a drum stick, a violin/viola/cello bow, a guitar pick, an end of a guitar, a conductor's baton, or the like). In an example, the audible feedback may include sound created at a musical instrument by the action, motion, or gesture (e.g., when a violin bow traverses a violin string, the string vibrates, causing sound to be produced), which may be augmented (e.g., amplified and played by a speaker, changed, or distorted) or the created sound may be added to by the audible feedback (e.g., additional sound may be played not caused by the musical instrument). In another example, the audible feedback may include sound created by a computer system, such as a Musical Instrument Digital Interface (MIDI) system, a drum kit, etc. This type of audible feedback may be created by, for example, tracking a gesture of one or more drum sticks (e.g., without hitting an actual drum), tracking movement of a conductor's baton, etc.

The visual feedback provided in the system may be displayed for an audience, a performer, a remote viewer, or a combination thereof. The visual feedback may include using a display screen, a VR or AR display, etc. Other visual feedback may include fireworks, animated or video sequences, lighting effects on a wearable device, or the like. The visual or audible feedback described herein may be based on additional activity of a user, such as dancing, gestures, predetermined effects, or the like.

FIG. 1 illustrates a pair of drum sticks 100 for creating visualization or audio effects in accordance with some embodiments. The pair of drum sticks 100 include a first drum stick 102A and a second drum stick 102B. Each of the pair of drum sticks 100 includes a respective motion sensor 104A and 104B and respective circuitry 106A and 106B. Although a single sensor 104A and 104B are illustrated in FIG. 1, it is understood that multiple sensors may be used on each drum stick 102A and 102B. The circuitry 106A and 106B may include a transceiver, a processor, memory, or a system on a chip. In an example, the first drum stick 102A may be a parent and the second drum stick 102B may be a child. The parent may receive information from the sensor 104B of the child, and the parent may forward that sensor information along with information from the sensor 104A of the parent to a device, such as a mobile device, a computer, a server, etc., for further processing. In another example, the pair of drum sticks 100 may independently send information to a device.

The pair of drum sticks 100 may be paired by assigning one to a left hand of a user and one to a right hand of a user (or simulating such). The left hand assigned drum stick may be assigned to output a first set of audible or visual feedback and the right hand assigned drum stick may be assigned to output a second set of audible or visual feedback. For example, either drum stick may be used to cause drum sound as audible feedback based on the location and motion of the drum stick, and one of the drum sticks may be assigned to a first visual effect (e.g., a flashing light on a proximate wearable device), and the other of the drum sticks may be assigned to a second visual effect (e.g., a visual effect on a display screen).

The sensors 104A, 104B may include a magnetometer, accelerometer, or gyroscope. For example, the sensors 104A, 104B may include a nine-axis sensor with a magnetometer, accelerometer, and a gyroscope for detecting location, position, and movement. The sensors 104A. 104B may be initiated at a starting location, position, or orientation, such that the sensors 104A. 104B may determine relative locations, positions, movement, or orientations in response to changes by the pair of drum sticks 100.

The sensor 104A may provide data based on movement of the drum stick 102A. The transceiver of circuitry 106A may transmit the sensor data to a device, such as a wearable device (e.g., a smart watch), a mobile device, a computer, a remote server, or the like. The device receiving the sensor data may include a processor to recognize a gesture from the sensor data. The gesture may be used to determine a visualization effect corresponding to the gesture or an audio effect including a drum sound corresponding to the gesture. The gesture may include movement from the pair of drum sticks 100 in coordination with each other. In an example, timing information may be sent to coordinate displaying the visualization effect and playing the audio effect. The gesture may be based on an orientation, location, movement, or force of one or both of the pair of drum sticks 100, for example as determined by one or more of the first sensor 104A or the second sensor 104B.

The gesture may be determined based on additional input, such as an additional sensor attached to an ankle or a foot of a user controlling the drum stick 102A. The additional sensor may output data to cause a second audio effect, such as a second drum sound (e.g., a bass drum sound) corresponding to a second gesture. The second audio effect may be played by a speaker. The gesture may include one or more of a linear movement, a tapping movement, a sweeping movement, a minimum acceleration, a minimum deceleration, or the like.

A display device may be used to display the visualization effect or a speaker may be used to play the audio effect. The speaker may be controlled by a MIDI player. The audio effect may include Multidimensional Polyphonic Expression instructions for use by the MIDI player. In an example, the processor of circuitry 106A may be used to determine the gesture. In an example, a visualization effect may be determined based on one or more previously recognized gestures (e.g., a series). The visualization effect may include using a plurality of wearable devices within a predetermined proximity of the drum stick 102A to display the visualization effect. Devices within the predetermined proximity may include devices on a wi-fi network, within range of a Bluetooth device or devices, within a specified distance, within a room, etc.

Figure 2A:
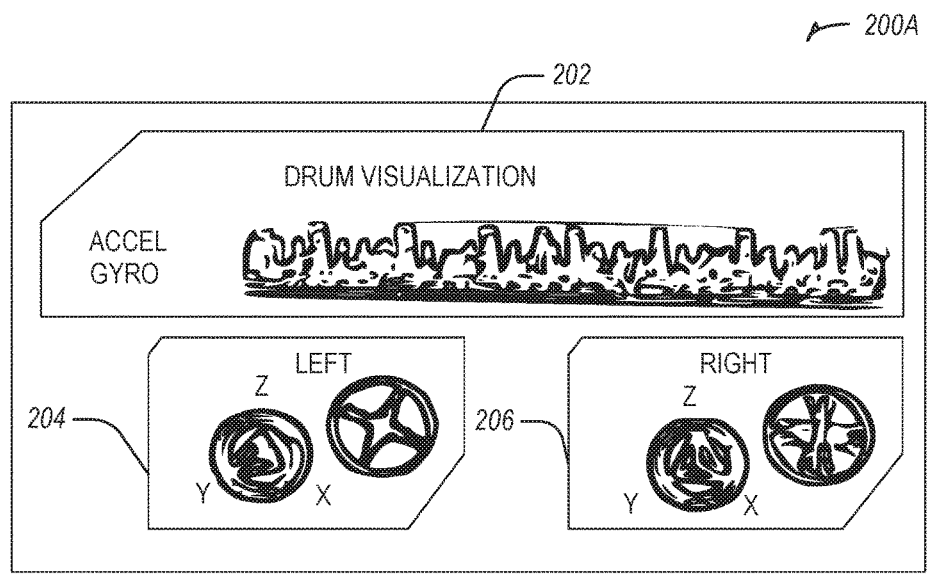
FIGS. 2A-2C illustrate example visualization effects in accordance with some embodiments.
Figure 2B:
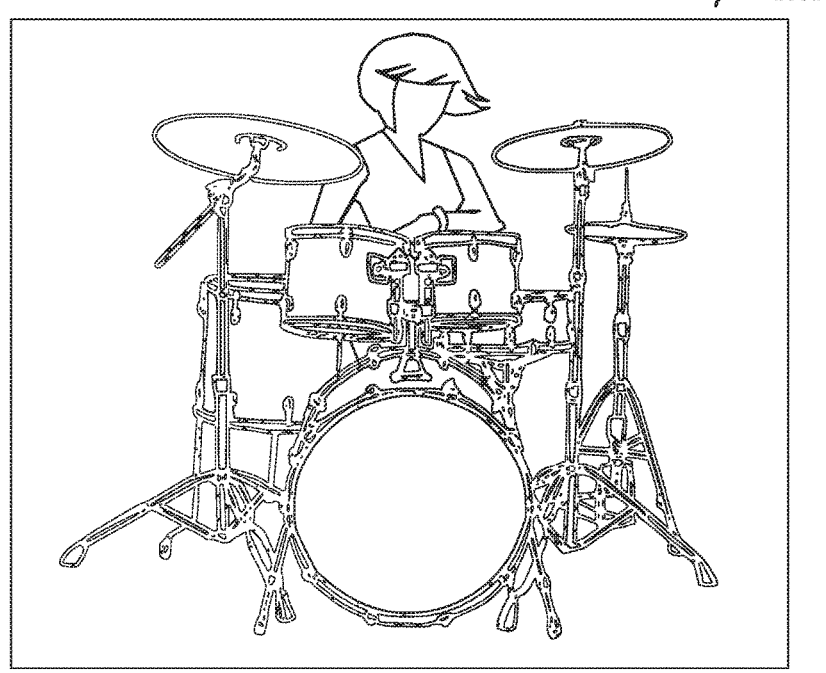
Figure 2C:
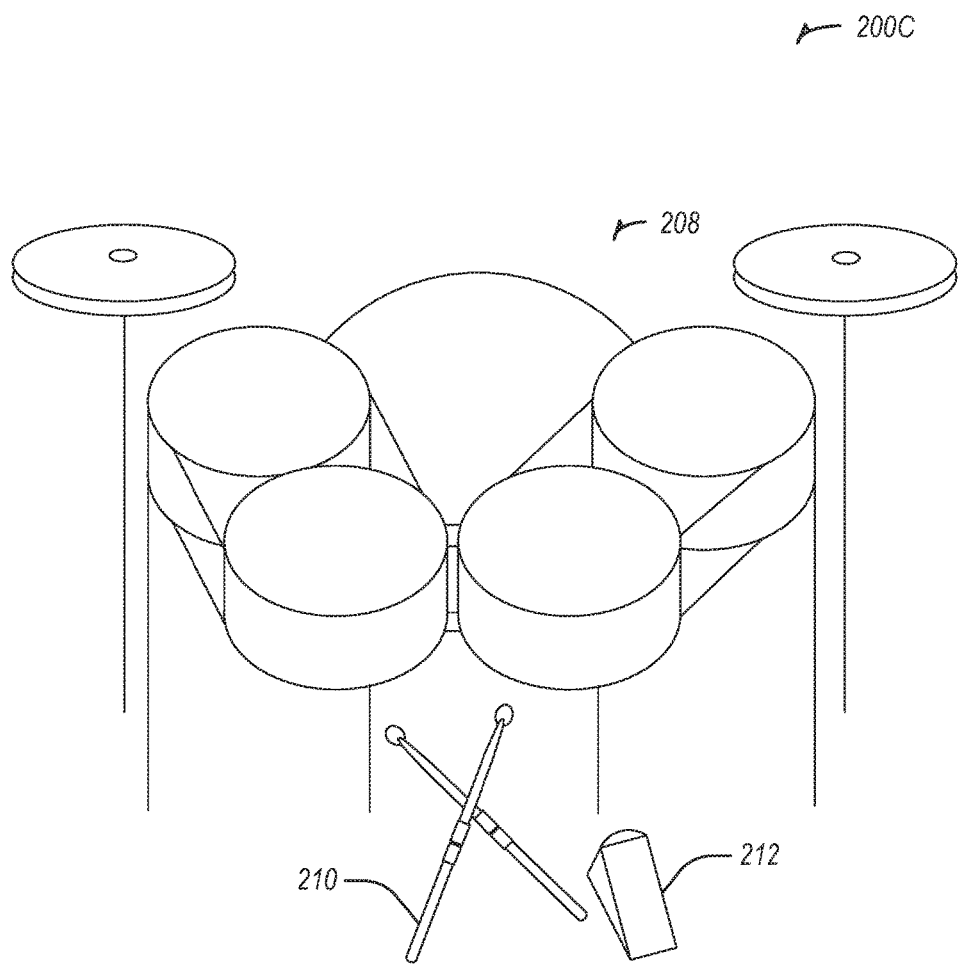

FIGS. 2A-2C illustrate example visualization effects 200A-200C in accordance with some embodiments. The first visualization effect 200A includes sensor visualization effects 202 and orientation visualization effects 204 and 206. The second visualization effect 200B includes a front-facing view of a drum set and a drummer. The third visualization effect 200C includes a point-of-view perspective display of a drum set 208. The components of the visualization effects 200A-200C may include virtual components or augmented reality components. For example, the drum sets displayed in visualization effects 200B-200C may be virtual (e.g., displayed using a VR display).

Motion data or gesture primitives detected by a sensor may be used to create visualizations or visual effects to accompany a performance, such as to enhance an audience experience. For example, enhanced visual experiences may be shown, such as capturing activity level (e.g., sensor visualization effects 202 related to an accelerometer or gyroscope of a drum stick or other musical instrument), orientation of the musical instrument device (e.g., drum sticks, as shown in the orientation visualization effects 204-206), or other aspects of a performance. A system to predetermine the visualization effect 200A may include a customizable platform to select a background or visual effects, which may be manipulated by a user. Audience interaction may be enabled, such as at wearable devices (e.g., wrist bands) where lights may turn on and off, which may be controlled using the musical instrument device (e.g., drum sticks).

In an example, the visualization effects 200A-200B may be presented to an audience of a user controlling a musical instrument device. For example, a display screen may be used to display visualization effects 200A or 200B. For visualization effect 200C, the point-of-view drum set 208 may be presented, in an example, on a display screen to an audience. In an example, the visualization effect 200C may be presented using a VR display to a controller of the musical instrument device (e.g., drum sticks). The visualization effect 200C within the VR display may show the point-of-view drum set 208 and may include virtual drum sticks 210 or a virtual pedal 212. The virtual drum sticks 210 may be displayed virtually at a location corresponding to real drum sticks based on sensors and location information of the real drum sticks. The user of the real drum sticks, while wearing the VR display, may see the virtual drum sticks 210 as if the user was holding the virtual drum sticks 210 (and hands may also be shown to further this effect). The user may wear an ankle or foot device with a sensor to detect motion of the ankle or foot. The detected motion may cause the foot pedal 212 to move (e.g., in the VR environment) and may cause an audible or visual effect to occur. The user wearing the VR display may play the drum set 208 virtually with the virtual drum sticks 210 by controlling the real drum sticks (and optionally the foot pedal 212). The drum set 208 may move or display a visualization according to motion of the real drum sticks (e.g., the cymbals may crash, a drum head may appear to vibrate, a played drum may light up, etc.).

Figure 3A:
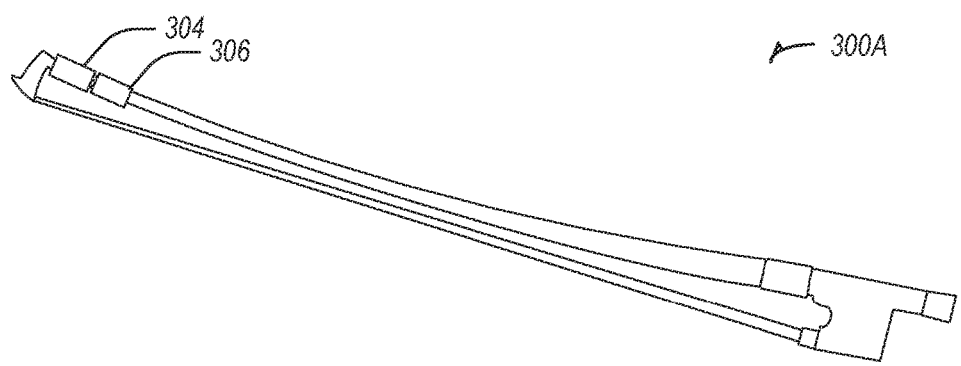
FIGS. 3A-3C illustrate instrumentation objects for creating visualization or audio effects in accordance with some embodiments.
Figure 3B:
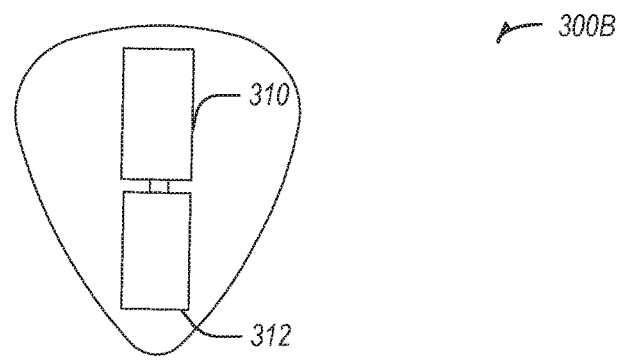
Figure 3C:
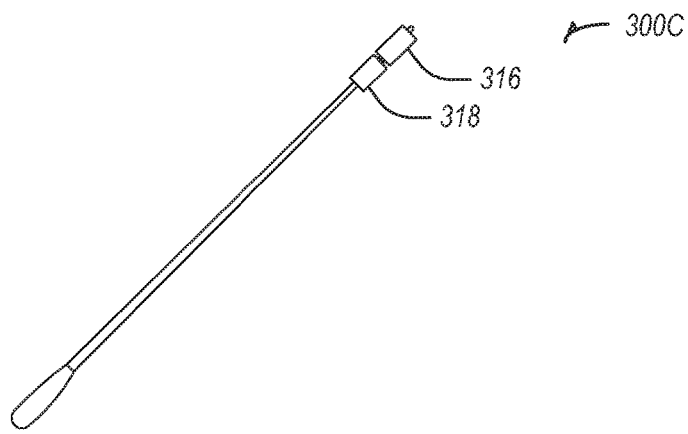

FIGS. 3A-3C illustrate instrumentation objects 300A-300C for creating visualization or audio effects in accordance with some embodiments.

For example, the instrumentation object 300A may be a violin bow, viola bow, cello bow, or other stringed instrument bow. The instrumentation object 300A includes a sensor 304 and may include circuitry 306, such as a transceiver, a processor, memory, or a system on a chip. In the example shown in FIG. 3A, the sensor 304 is located at the tip of the instrumentation object 300A. In other examples, the sensor 304 may be located in the middle of the instrumentation object 300A or at the frog. The sensor 304 may include a gyroscope, an accelerometer, or a magnetometer to determine position, orientation, or movement of the instrumentation object 300A. In an example, a plurality of sensors may be disposed on the instrumentation object 300A (e.g., one at the tip, one in the middle, and one at the frog).

The sensor 304 may track back and forth movement of the instrumentation object 300A. The sensor 304 may track bow tapping movements (e.g. in a perpendicular or partially perpendicular movement to the back and forth traditional bow movement on a stringed instrument). The tracked movement (or position or orientation) of the instrumentation object 300A may be used to create or identify visual effects to be shown. The visual effects may be matched to the music created by playing the stringed instrument with the instrumentation object 300A. In another example, augmented audible feedback may be created or identified by the tracked movement, which may be played in addition to the music created. For example, a real violin may be played using the instrumentation object 300A as a bow, and the sensor on the bow may add to a performance experience by integrating visual or audio effects in addition to the music created by playing the violin. For example, when the bow moves in a first direction, a first visual or audible effect may be created or identified and when the bow moves in a second direction, a second visual or audible effect may be created or identified. In an example, mixers may be used to add in augmented sound. For example, a Multidimensional Polyphonic Expression for use with a MIDI player may be used to create or play the augmented sound.

In an example, a player of an instrument using the instrumentation object 300A may have a sensor on a finger or fingers of the player. For example, a violin player may place a sensor or sensors on one or more fingers used to play violin (e.g., a fourth finger of the player's left hand). The movement of the pinky finger may indicate a particular visual effect. For example, when playing a stringed instrument, notes may often be played interchangeably with different fingers (e.g., the fourth finger in first position on a first string, an open second string, or a second finger in a third position on the first string may all correspond to a single note). By playing with a particular finger, a specific visual (or audible) affect may be identified or created.

The instrumentation object 300A may be in communication with a server. The server may include a processor to receive sensor data from the sensor 304 of the instrumentation object 300A, the sensor data may be based on movement of the instrumentation object 300A. The processor may recognize a gesture from the sensor data, such as a back or forth movement, a tapping of the instrumentation object 300A on a string, etc. The processor may determine, such as from the gesture, a visualization effect corresponding to the gesture or an audio effect corresponding to the gesture. The visualization effect may be determined using a visualization engine. In an example, the processor may cause the visualization effect or the audio effect to be output in response to the determination. The audio effect may include a natural sound caused by the movement of the instrumentation object 300A.

In an example, causing the visualization effect to be output may include sending the visualization effect to a virtual reality headset of a user controlling the instrumentation object 300A, for example, to be displayed on the VR headset. Causing the audio effect to be output may include sending the audio effect to a speaker to play the audio effect. The processor may send the visualization effect to a display to be displayed in coordination with the audio effect played by the speaker. The processor may receive data from the sensor 304 indicating an initial position of the instrumentation object 300A and recognize the gesture based on a determined final position of the instrumentation object 300A. The visualization effect or the audio effect may be determined based on an orientation of the instrumentation object 300A identified in the sensor data. The visualization effect may be based on one or more (e.g., a series) of previously recognized gestures. The visualization effect may include a lighting effect. Outputting the visualization effect may include sending the lighting effect to a plurality of wearable devices, such as within a predetermined proximity of the instrumentation object 300A to be displayed, for example at the plurality of wearable devices. Devices within the predetermined proximity may include devices on a wi-fi network, within range of a Bluetooth device or devices, within a specified distance, within a room, etc. The gesture may include a linear movement, a tapping movement, a sweeping movement, a minimum or maximum acceleration, a maximum or minimum deceleration, or the like. The audio effect may include a Multidimensional Polyphonic Expression instruction for a MIDI player.

The instrumentation object 300B may be a guitar pick. The instrumentation object 300B includes a sensor 310 and may include circuitry 312, such as a transceiver, a processor, memory, or a system on a chip. The instrumentation object 300B may be used to strum a stringed instrument, such as a guitar. Movement of the instrumentation object 300B may correspond with a visual or audible effect to be produced. For example, when the instrumentation object 300B is used to strum a guitar upward, a first visual or audible effect may be identified and when the instrumentation object 300B is used to strum the guitar downward, a second visual or audible effect may be identified and used.

The instrumentation object 300B may be in communication with a server. The server may include a processor to receive sensor data from the sensor 310 of the instrumentation object 300B, the sensor data may be based on movement of the instrumentation object 300B. The processor (e.g., circuitry 312) may recognize a gesture from the sensor data, such as a strumming movement, a slapping movement, etc. The processor may determine, such as from the gesture, a visualization effect corresponding to the gesture or an audio effect corresponding to the gesture. The visualization effect may be determined using a visualization engine. In an example, the processor may cause the visualization effect or the audio effect to be output in response to the determination. The audio effect may include a natural sound caused by the movement of the instrumentation object 300B.

In an example, causing the visualization effect to be output may include sending the visualization effect to a virtual reality headset of a user controlling the instrumentation object 300B, for example, to be displayed on the VR headset. Causing the audio effect to be output may include sending the audio effect to a speaker to play the audio effect. The processor may send the visualization effect to a display to be displayed in coordination with the audio effect played by the speaker. The processor may receive data from the sensor 310 indicating an initial position of the instrumentation object 300B and recognize the gesture based on a determined final position of the instrumentation object 300B. The visualization effect or the audio effect may be determined based on an orientation of the instrumentation object 300B identified in the sensor data. The visualization effect may be based on one or more (e.g., a series) of previously recognized gestures. The visualization effect may include a lighting effect. Outputting the visualization effect may include sending the lighting effect to a plurality of wearable devices, such as within a predetermined proximity of the instrumentation object 300B to be displayed, for example at the plurality of wearable devices. Devices within the predetermined proximity may include devices on a wi-fi network, within range of a Bluetooth device or devices, within a specified distance, within a room, etc. The gesture may include a linear movement, a tapping movement, a sweeping movement, a minimum or maximum acceleration, a maximum or minimum deceleration, or the like. The audio effect may include a Multidimensional Polyphonic Expression instruction for a MIDI player.

The instrumentation object 300C may be a conductor's baton. The instrumentation object 300C includes a sensor 316 and may include circuitry 318, such as a transceiver, a processor, memory, or a system on a chip. The instrumentation object 300C may be used to conduct an orchestra, either real or virtual. The real orchestra may play music in response to movement of the instrumentation object 300C or orchestral sound may be created in response to movement of the instrumentation object 300C with a virtual orchestra. A visual effect or audible effect may be created or identified in response to movement of the instrumentation object 300C.

The instrumentation object 300C may be in communication with a server. The server may include a processor to receive sensor data from the sensor 316 of the instrumentation object 300C, the sensor data may be based on movement of the instrumentation object 300C. The processor (e.g., circuitry 318) may recognize a gesture from the sensor data, such as a up and down or left and right movement, a conducting cadence movement (e.g., based on a tempo of music being played, such as 3/4, 4/4, 7/8, etc.), or the like. The processor may determine, such as from the gesture, a visualization effect corresponding to the gesture or an audio effect corresponding to the gesture. The visualization effect may be determined using a visualization engine. In an example, the processor may cause the visualization effect or the audio effect to be output in response to the determination.

In an example, causing the visualization effect to be output may include sending the visualization effect to a virtual reality headset of a user controlling the instrumentation object 300C, for example, to be displayed on the VR headset. Causing the audio effect to be output may include sending the audio effect to a speaker to play the audio effect. The processor may send the visualization effect to a display to be displayed in coordination with the audio effect played by the speaker. The processor may receive data from the sensor 316 indicating an initial position of the instrumentation object 300C and recognize the gesture based on a determined final position of the instrumentation object 300C. The visualization effect or the audio effect may be determined based on an orientation of the instrumentation object 300C identified in the sensor data. The visualization effect may be based on one or more (e.g., a series) of previously recognized gestures. The visualization effect may include a lighting effect. Outputting the visualization effect may include sending the lighting effect to a plurality of wearable devices, such as within a predetermined proximity of the instrumentation object 300C to be displayed, for example at the plurality of wearable devices. Devices within the predetermined proximity may include devices on a wi-fi network, within range of a Bluetooth device or devices, within a specified distance, within a room, etc. The gesture may include a linear movement, a tapping movement, a sweeping movement, a minimum or maximum acceleration, a maximum or minimum deceleration, or the like. The audio effect may include a Multidimensional Polyphonic Expression instruction for a MIDI player.

Figure 4:
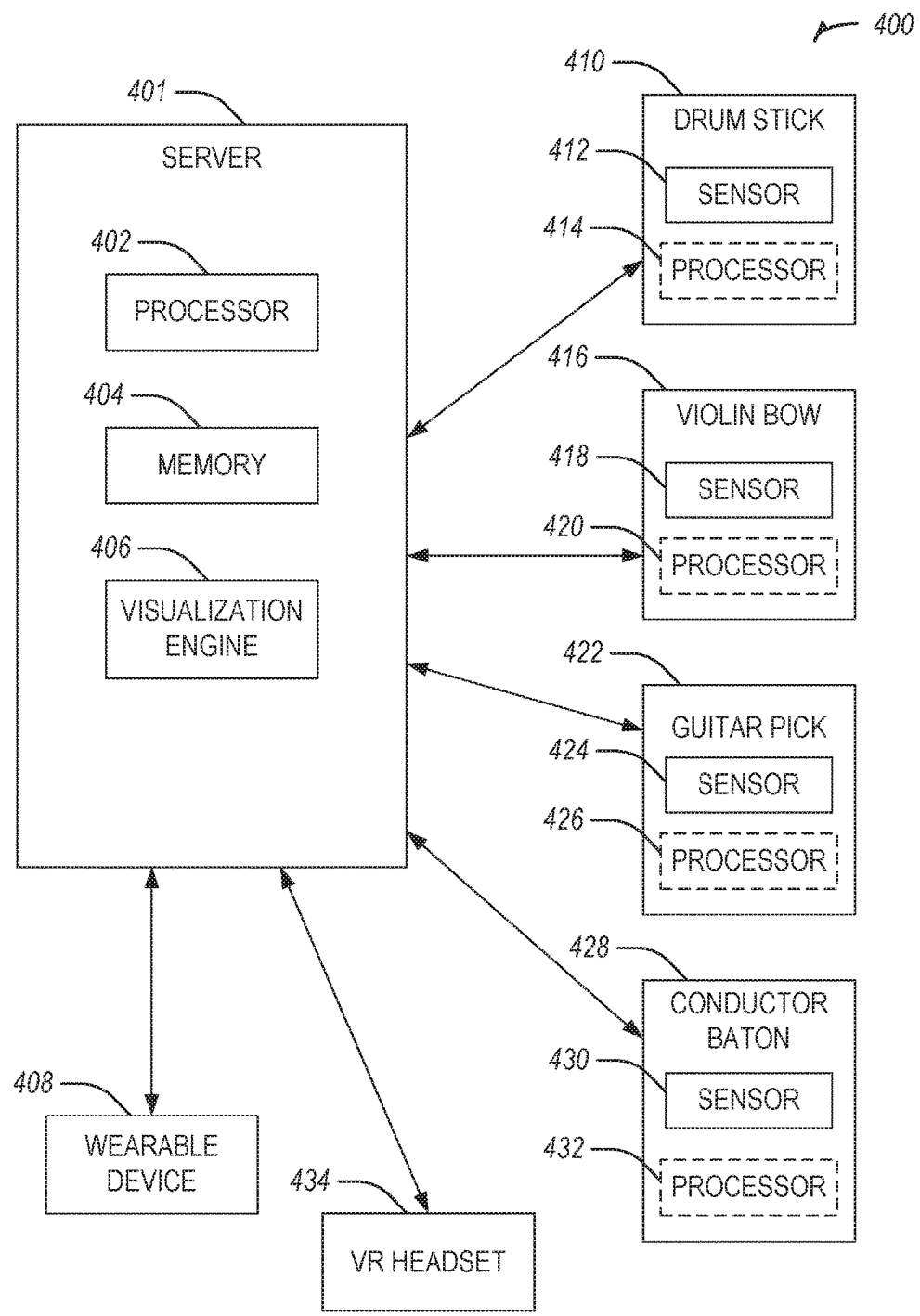
FIG. 4 illustrates a system for providing effects corresponding to movement of an instrumentation object in accordance with some embodiments.

FIG. 4 illustrates a system 400 for providing effects corresponding to movement of an instrumentation object in accordance with some embodiments. Remote instrumentation devices may include a drum stick 410, a violin bow 416, a guitar pick 422, a conductor's baton 428, or the like. The instrumentation devices 410, 416, 422, and 428 may include respective sensors (e.g., 412, 418, 424, 430) and optionally respective transceivers or processors (e.g., 414, 420, 426, 432).

The system 400 includes a server 401 in communication with one or more remote instrumentation devices (e.g., 410, 416, 422, 428), or a wearable device 408. The server 401 includes a processor 402, memory 404, and a visualization engine 406. The processor 402 may receive sensor data from a sensor (412, 418, 424, or 430) of one or more of the remote instrumentation devices (e.g., 410, 416, 422, 428), such as the drum stick sensor 412. The drum stick 410 may be paired with a second drum stick, and the pair may include a parent and a child drum stick. For example, the child drum stick may have limited communication capabilities (e.g., capable of communicating with the parent drum stick, but may be incapable of communicating with another remote device. The parent drum stick may have the processor 414 or a transceiver, for example to communicate with a mobile device, wearable device, or remote device. The pair of drum sticks may be used together. The processor 402 may receive the sensor data from one of the pair of drum sticks (e.g., a parent) or both (e.g., individually, or via the parent). In an example, the sensor data is based on movement of the drum stick 410.

In an example, the processor 402 may recognize a gesture from the sensor data. For example, the gesture may include a drum strike, a violin playing movement, a conductor baton conducting movement, a guitar strum, etc. The gesture may include one or more of a linear movement, a tapping movement, a sweeping movement, a minimum or maximum acceleration, a minimum or maximum deceleration, or the like. The processor 402 may determine, for example using the gesture, a visualization effect corresponding to the gesture. The visualization effect may be determined using the visualization engine 406. In an example, to determine the visualization effect, the processor 402 is to determine the visualization effect based on a series of previously recognized gestures. The visualization effect may include a lighting effect, such as a flashing light or light sequence on a screen, a virtual reality light effect, or a light effect sent for display to a plurality of wearable devices (e.g., the wearable device 408). The plurality of wearable devices may be identified within a proximity of the remote instrumentation devices (e.g., 410, 416, 422, 428). The processor 402 may receive wearable sensor data from the plurality of wearable devices (e.g., the wearable device 408), which may be within a predetermined proximity of the remote instrumentation devices (e.g., 410, 416, 422, 428). The visualization effect may be modified, for example, based on the wearable sensor data. Devices within the predetermined proximity may include devices on a wi-fi network, within range of a Bluetooth device or devices, within a specified distance, within a room, etc.

The processor 402 may determine an audio effect corresponding to the gesture including, for example, a drum sound, a violin sound (or other stringed instrument sound), a guitar sound, an orchestral sound (e.g., a combination of sounds from a plurality of instruments), or the like. In an example, the visualization effect and the audio effect are determined based on an orientation of the remote instrumentation devices (e.g., 410, 416, 422, 428) identified in the sensor data. In an example, the audio effect may include Multidimensional Polyphonic Expression instructions for a musical instrument digital interface (MIDI) player.

The processor 402 may cause the visualization effect or the audio effect to be output, such as in response to the determination. In an example, the visualization effect may be output to a virtual reality headset 434, which may display the visualization effect using a virtual reality display The virtual reality headset 434 may be on a user who is controlling a remote instrumentation device (e.g., 410, 416, 422, 428). The visualization effect may be displayed in coordination with the audio effect played, for example, by a speaker. The speaker may be used to play the audio effect.

In an example, the processor 402 may receive data from the sensor indicating an initial position of the remote instrumentation devices (e.g., 410, 416, 422, 428). For example, the processor 402 may determine a final position of the remote instrumentation devices (e.g., 410, 416, 422, 428), such as a drum stick 410. In an example, the drum stick 410 may be used to generate the drum sound (e.g., without striking a drum), which may be determined based on the initial position and the final position.

In an example, the processor 402 may receive additional sensor data from a second sensor attached to an ankle or a foot of a user who is controlling the drum stick. A second gesture may be recognized from the additional sensor data. The processor 402 may determine from the second gesture, a second audio effect or a second visualization effect. The second audio effect may include a second drum sound corresponding to the second gesture. The processor 402 may cause the second audio effect or the second visualization effect to be output with the visualization effect or the audio effect.

Figure 5:
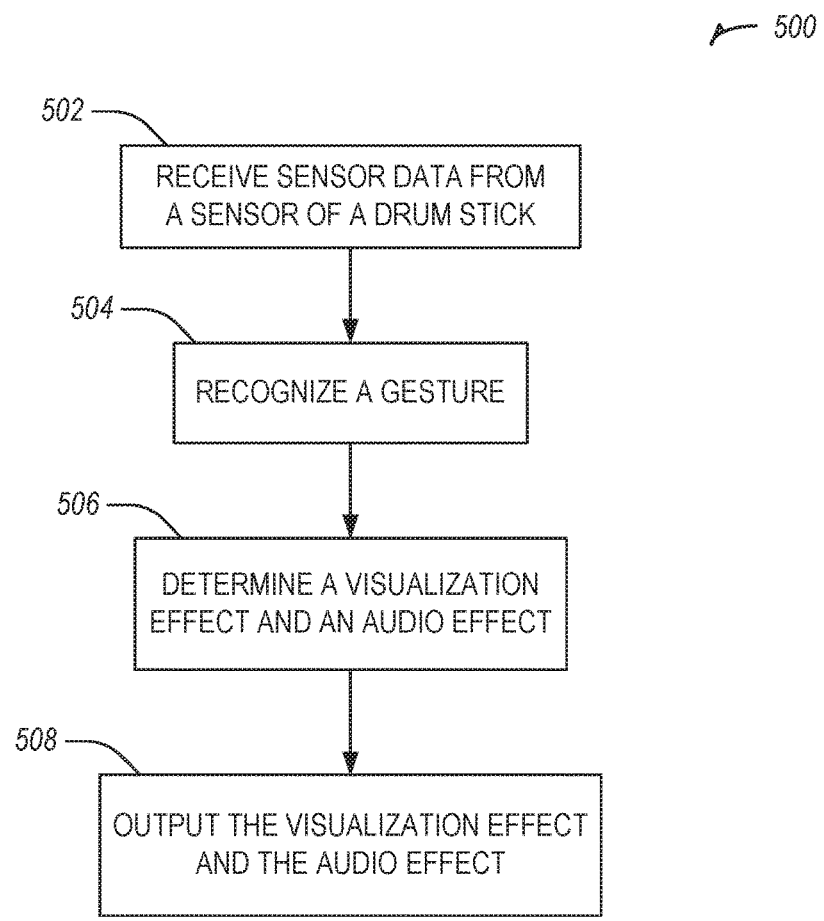
FIG. 5 illustrates a flowchart showing a technique for providing effects corresponding to movement of an instrumentation object in accordance with some embodiments.

FIG. 5 illustrates a flowchart showing a technique 500 for providing effects corresponding to movement of an instrumentation object in accordance with some embodiments. The technique 500 includes an operation 502 to receive sensor data from a sensor of at least one drum stick of a pair of drum sticks. The sensor data may be based on movement of the at least one drum stick. The sensor data may include data from sensors of both the pair of drum sticks. The Gesture may include movement of the pair of drum sticks in coordination with each other.

The technique 500 includes an operation 504 to recognize a gesture. The gesture may include a linear movement, a tapping movement, a sweeping movement, a minimum or maximum acceleration, a minimum or maximum deceleration, or the like. The technique 500 includes an operation 506 to determine a visualization effect and an audio effect. The effects corresponding to the gesture. In an example, determining the visualization effect includes using a visualization engine. In an example, determining the visualization effect includes determining the visualization effect based on one or more (e.g., a series) of previously recognized gestures. The audio effect may include Multidimensional Polyphonic Expression instructions for a MIDI player.

The technique 500 includes an operation 508 to output the visualization effect and the audio effect, such as in response to the determination. Outputting the visualization effect may include sending the visualization effect to a virtual reality headset of a user controlling the pair of drum sticks to be displayed on the virtual reality headset. Outputting the audio effect may include sending the audio effect to a speaker to play the audio effect. The visualization effect and the audio effect may be displayed and played, respectively, in coordination.

In an example, the technique 500 may include receiving data from the sensor indicating an initial position of the drum stick, and recognizing the gesture may include determining a final position of the drum stick. The drum sound may be determined based on the initial position or the final position. The visualization effect corresponding to the gesture or the audio effect including the drum sound may corresponding to the gesture may be determined based on an orientation of the drum stick identified in the sensor data.

The technique 500 may include receiving additional sensor data from a second sensor attached to an ankle or a foot of a user controlling the drum stick, recognizing a second gesture from the additional sensor data, determining, from the second gesture, a second audio effect including a second drum sound corresponding to the second gesture, and causing the second audio effect to be output with the visualization effect and the audio effect. The technique 500 may include receiving wearable sensor data from a plurality of wearable devices, such as within a predetermined proximity of the drum stick. The visualization effect may be modified based on the wearable sensor data. The visualization effect may include a lighting effect, which may be sent to a plurality of wearable devices within a predetermined proximity of the drum stick, such as to be displayed at the plurality of wearable devices. Devices within the predetermined proximity may include devices on a wi-fi network, within range of a Bluetooth device or devices, within a specified distance, within a room, etc.

Figure 6:
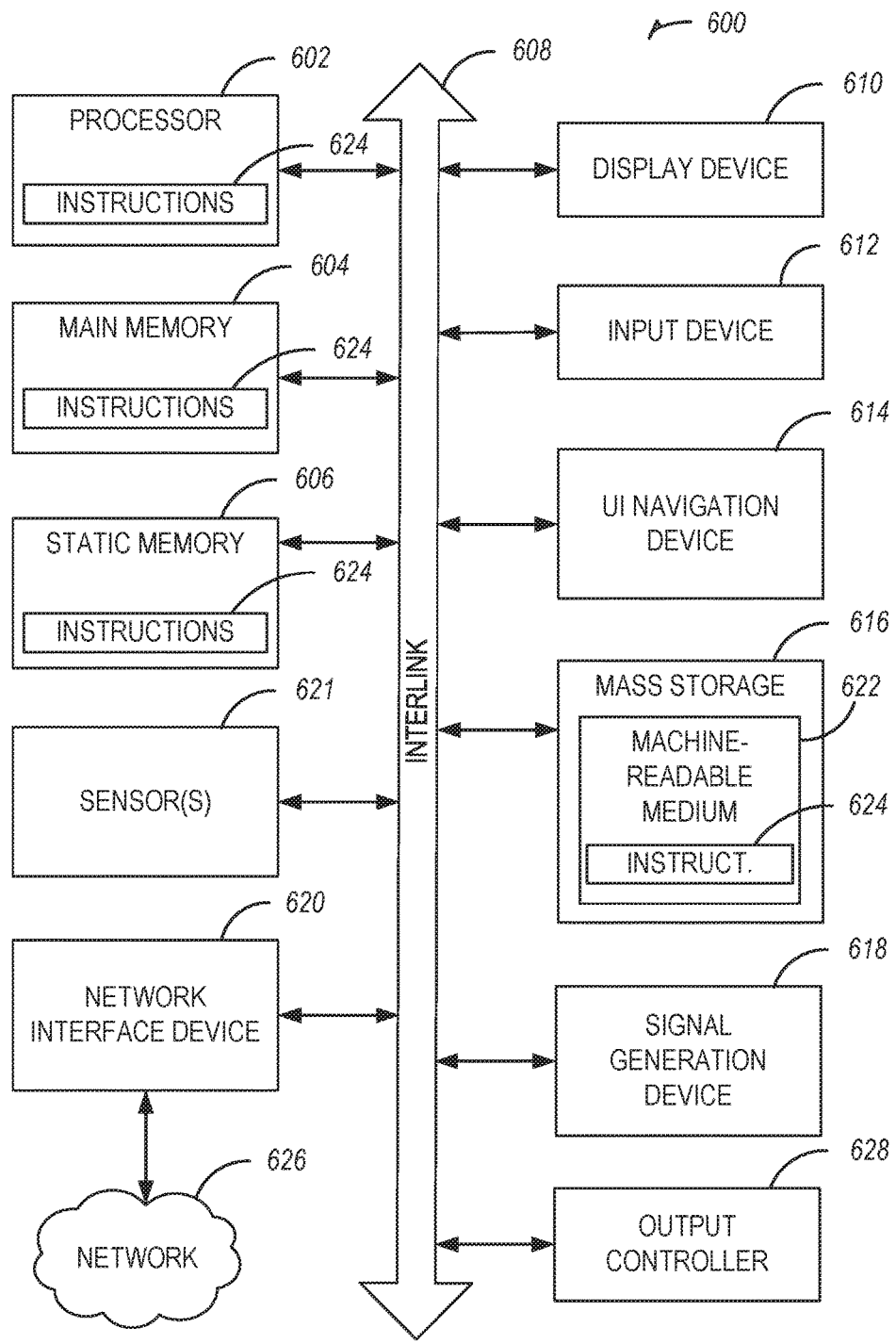
FIG. 6 illustrates generally an example of a block diagram of a machine upon which any one or more of the techniques (e.g., methodologies) discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a server in communication with a pair of drum sticks, the server comprising: a processor to: receive sensor data from a sensor of at least one drum stick of the pair of drum sticks, the sensor data based on movement of the at least one drum stick; recognize a gesture from the sensor data; determine, from the gesture, a visualization effect corresponding to the gesture and an audio effect including a drum sound corresponding to the gesture; and cause the visualization effect and the audio effect to be output in response to the determination.

In Example 2, the subject matter of Example 1 optionally includes wherein to determine the visualization effect, the processor is to use a visualization engine.

In Example 3, the subject matter of any one or more of Examples 1-2 optionally include wherein the sensor data includes data from sensors of both of the pair of drum sticks and wherein the gesture includes movement of the pair of drum sticks in coordination with each other.

In Example 4, the subject matter of any one or more of Examples 1-3 optionally include wherein to cause the visualization effect to be output, the processor is to send the visualization effect to a virtual reality headset of a user controlling the pair of drum sticks to be displayed on the virtual reality headset.

In Example 5, the subject matter of any one or more of Examples 1-4 optionally include wherein to cause the audio effect to be output, the processor is to send the audio effect to a speaker to play the audio effect.

In Example 6, the subject matter of Example 5 optionally includes wherein to cause the visualization effect to be output, the processor is to send the visualization effect to a display to be displayed in coordination with the audio effect played by the speaker.

In Example 7, the subject matter of any one or more of Examples 1-6 optionally include wherein the processor is further to receive data from the sensor indicating an initial position of the drum stick, and wherein to recognize the gesture, the processor is to determine a final position of the drum stick.

In Example 8, the subject matter of Example 7 optionally includes wherein the drum sound is determined based on the initial position and the final position.

In Example 9, the subject matter of any one or more of Examples 1-8 optionally include wherein the visualization effect corresponding to the gesture and the audio effect including the drum sound corresponding to the gesture are determined based on an orientation of the drum stick identified in the sensor data.

In Example 10, the subject matter of any one or more of Examples 1-9 optionally include wherein to determine the visualization effect, the processor is to determine the visualization effect based on a series of previously recognized gestures.

In Example 11, the subject matter of any one or more of Examples 1-10 optionally include wherein the processor is further to: receive additional sensor data from a second sensor attached to an ankle or a foot of a user controlling the drum stick; recognize a second gesture from the additional sensor data; determine, from the second gesture, a second audio effect including a second drum sound corresponding to the second gesture; and cause the second audio effect to be output with the visualization effect and the audio effect.

In Example 12, the subject matter of any one or more of Examples 1-11 optionally include wherein the processor is further to: receive wearable sensor data from a plurality of wearable devices within a predetermined proximity of the drum stick; and modify the visualization effect based on the wearable sensor data.

In Example 13, the subject matter of any one or more of Examples 1-12 optionally include wherein the visualization effect includes a lighting effect, and wherein to cause the visualization effect to be output, the processor is to send the lighting effect to a plurality of wearable devices within a predetermined proximity of the drum stick to be displayed at the plurality of wearable devices.

In Example 14, the subject matter of any one or more of Examples 1-13 optionally include wherein the gesture includes at least one of a linear movement, a tapping movement, a sweeping movement, a minimum acceleration, or a minimum deceleration.

In Example 15, the subject matter of any one or more of Examples 1-14 optionally include wherein the audio effect includes Multidimensional Polyphonic Expression instructions for a musical instrument digital interface (MIDI) player.

Example 16 is a method for providing effects corresponding to movement of drum sticks, the method comprising: receiving sensor data from a sensor of at least one drum stick of a pair of drum sticks, the sensor data based on movement of the at least one drum stick; recognizing a gesture from the sensor data; determining, from the gesture, a visualization effect corresponding to the gesture and an audio effect including a drum sound corresponding to the gesture; and causing the visualization effect and the audio effect to be output in response to the determination.

In Example 17, the subject matter of Example 16 optionally includes wherein determining the visualization effect includes using a visualization engine.

In Example 18, the subject matter of any one or more of Examples 16-17 optionally include wherein the sensor data includes data from sensors of both of the pair of drum sticks and wherein the gesture includes movement of the pair of drum sticks in coordination with each other.

In Example 19, the subject matter of any one or more of Examples 16-18 optionally include wherein causing the visualization effect to be output includes sending the visualization effect to a virtual reality headset of a user controlling the pair of drum sticks to be displayed on the virtual reality headset.

In Example 20, the subject matter of any one or more of Examples 16-19 optionally include wherein causing the audio effect to be output includes sending the audio effect to a speaker to play the audio effect.

In Example 21, the subject matter of Example 20 optionally includes wherein causing the visualization effect to be output includes sending the visualization effect to a display to be displayed in coordination with the audio effect played by the speaker.

In Example 22, the subject matter of any one or more of Examples 16-21 optionally include receiving data from the sensor indicating an initial position of the drum stick, and wherein recognizing the gesture includes determining a final position of the drum stick.

In Example 23, the subject matter of Example 22 optionally includes wherein the drum sound is determined based on the initial position and the final position.

In Example 24, the subject matter of any one or more of Examples 16-23 optionally include wherein the visualization effect corresponding to the gesture and the audio effect including the drum sound corresponding to the gesture are determined based on an orientation of the drum stick identified in the sensor data.

In Example 25, the subject matter of any one or more of Examples 16-24 optionally include wherein determining the visualization effect includes determining the visualization effect based on a series of previously recognized gestures.

In Example 26, the subject matter of any one or more of Examples 16-25 optionally include receiving additional sensor data from a second sensor attached to an ankle or a foot of a user controlling the drum stick; recognizing a second gesture from the additional sensor data; determining, from the second gesture, a second audio effect including a second drum sound corresponding to the second gesture; and causing the second audio effect to be output with the visualization effect and the audio effect.

In Example 27, the subject matter of any one or more of Examples 16-26 optionally include receiving wearable sensor data from a plurality of wearable devices within a predetermined proximity of the drum stick; and modifying the visualization effect based on the wearable sensor data.

In Example 28, the subject matter of any one or more of Examples 16-27 optionally include wherein the visualization effect includes a lighting effect, and wherein causing the visualization effect to be output includes sending the lighting effect to a plurality of wearable devices within a predetermined proximity of the drum stick to be displayed at the plurality of wearable devices.

In Example 29, the subject matter of any one or more of Examples 16-28 optionally include wherein the gesture includes at least one of a linear movement, a tapping movement, a sweeping movement, a minimum acceleration, or a minimum deceleration.

In Example 30, the subject matter of any one or more of Examples 16-29 optionally include wherein the audio effect includes Multidimensional Polyphonic Expression instructions for a musical instrument digital interface (MIDI) player.

Example 31 is at least one machine-readable medium including instructions for operation of a computing system, which when executed by a machine, cause the machine to perform operations of any of the methods of Examples 16-30.

Example 32 is an apparatus comprising means for performing any of the methods of Examples 16-30.

Example 33 is at least one machine-readable medium including instructions for providing effects corresponding to movement of drum sticks, which when executed by a machine, cause the machine to: receive sensor data from a sensor of at least one drum stick of a pair of drum sticks, the sensor data based on movement of the at least one drum stick; recognize a gesture from the sensor data; determine, from the gesture, a visualization effect corresponding to the gesture and an audio effect including a drum sound corresponding to the gesture; and cause the visualization effect and the audio effect to be output in response to the determination.

In Example 34, the subject matter of Example 33 optionally includes wherein the instructions to determine the visualization effect include instructions to use a visualization engine.

In Example 35, the subject matter of any one or more of Examples 33-34 optionally include wherein the sensor data includes data from sensors of both of the pair of drum sticks and wherein the gesture includes movement of the pair of drum sticks in coordination with each other.

In Example 36, the subject matter of any one or more of Examples 33-35 optionally include wherein the instructions to cause the visualization effect to be output include instructions to send the visualization effect to a virtual reality headset of a user controlling the pair of drum sticks to be displayed on the virtual reality headset.

In Example 37, the subject matter of any one or more of Examples 33-36 optionally include wherein the instructions to cause the audio effect to be output include instructions to send the audio effect to a speaker to play the audio effect.

In Example 38, the subject matter of Example 37 optionally includes wherein the instructions to cause the visualization effect to be output include instructions to send the visualization effect to a display to be displayed in coordination with the audio effect played by the speaker.

In Example 39, the subject matter of any one or more of Examples 33-38 optionally include instructions to receive data from the sensor indicating an initial position of the drum stick, and wherein the instructions to recognize the gesture include instructions to determine a final position of the drum stick.

In Example 40, the subject matter of Example 39 optionally includes wherein the drum sound is determined based on the initial position and the final position.

In Example 41, the subject matter of any one or more of Examples 33-40 optionally include wherein the visualization effect corresponding to the gesture and the audio effect including the drum sound corresponding to the gesture are determined based on an orientation of the drum stick identified in the sensor data.

In Example 42, the subject matter of any one or more of Examples 33-41 optionally include wherein the instructions to determine the visualization effect include instructions to determine the visualization effect based on a series of previously recognized gestures.

In Example 43, the subject matter of any one or more of Examples 33-42 optionally include instructions to: receive additional sensor data from a second sensor attached to an ankle or a foot of a user controlling the drum stick; recognize a second gesture from the additional sensor data; determine, from the second gesture, a second audio effect including a second drum sound corresponding to the second gesture; and cause the second audio effect to be output with the visualization effect and the audio effect.

In Example 44, the subject matter of any one or more of Examples 33-43 optionally include instructions to: receive wearable sensor data from a plurality of wearable devices within a predetermined proximity of the drum stick; and modify the visualization effect based on the wearable sensor data.

In Example 45, the subject matter of any one or more of Examples 33-44 optionally include wherein the visualization effect includes a lighting effect, and wherein the instructions to cause the visualization effect to be output include instructions to send the lighting effect to a plurality of wearable devices within a predetermined proximity of the drum stick to be displayed at the plurality of wearable devices.

In Example 46, the subject matter of any one or more of Examples 33-45 optionally include wherein the gesture includes at least one of a linear movement, a tapping movement, a sweeping movement, a minimum acceleration, or a minimum deceleration.

In Example 47, the subject matter of any one or more of Examples 33-46 optionally include wherein the audio effect includes Multidimensional Polyphonic Expression instructions for a musical instrument digital interface (MIDI) player.

Example 48 is an apparatus for providing effects corresponding to movement of drum sticks, the apparatus comprising: means for receiving sensor data from a sensor of at least one drum stick of a pair of drum sticks, the sensor data based on movement of the at least one drum stick; means for recognizing a gesture from the sensor data; means for determining, from the gesture, a visualization effect corresponding to the gesture and an audio effect including a drum sound corresponding to the gesture; and means for causing the visualization effect and the audio effect to be output in response to the determination.

In Example 49, the subject matter of Example 48 optionally includes wherein the means for determining the visualization effect include means for using a visualization engine.

In Example 50, the subject matter of any one or more of Examples 48-49 optionally include wherein the sensor data includes data from sensors of both of the pair of drum sticks and wherein the gesture includes movement of the pair of drum sticks in coordination with each other.

In Example 51, the subject matter of any one or more of Examples 48-50 optionally include wherein the means for causing the visualization effect to be output include means for sending the visualization effect to a virtual reality headset of a user controlling the pair of drum sticks to be displayed on the virtual reality headset.

In Example 52, the subject matter of any one or more of Examples 48-51 optionally include wherein the means for causing the audio effect to be output include means for sending the audio effect to a speaker to play the audio effect.

In Example 53, the subject matter of Example 52 optionally includes wherein the means for causing the visualization effect to be output include means for sending the visualization effect to a display to be displayed in coordination with the audio effect played by the speaker.

In Example 54, the subject matter of any one or more of Examples 48-53 optionally include means for receiving data from the sensor indicating an initial position of the drum stick, and wherein the means for recognizing the gesture include means for determining a final position of the drum stick.

In Example 55, the subject matter of Example 54 optionally includes wherein the drum sound is determined based on the initial position and the final position.

In Example 56, the subject matter of any one or more of Examples 48-55 optionally include wherein the visualization effect corresponding to the gesture and the audio effect including the drum sound corresponding to the gesture are determined based on an orientation of the drum stick identified in the sensor data.

In Example 57, the subject matter of any one or more of Examples 48-56 optionally include wherein the means for determining the visualization effect include means for determining the visualization effect based on a series of previously recognized gestures.

In Example 58, the subject matter of any one or more of Examples 48-57 optionally include means for receiving additional sensor data from a second sensor attached to an ankle or a foot of a user controlling the drum stick; means for recognizing a second gesture from the additional sensor data; means for determining, from the second gesture, a second audio effect including a second drum sound corresponding to the second gesture; and means for causing the second audio effect to be output with the visualization effect and the audio effect.

In Example 59, the subject matter of any one or more of Examples 48-58 optionally include means for receiving wearable sensor data from a plurality of wearable devices within a predetermined proximity of the drum stick; and means for modifying the visualization effect based on the wearable sensor data.

In Example 60, the subject matter of any one or more of Examples 48-59 optionally include wherein the visualization effect includes a lighting effect, and wherein the means for causing the visualization effect to be output include means for sending the lighting effect to a plurality of wearable devices within a predetermined proximity of the drum stick to be displayed at the plurality of wearable devices.

In Example 61, the subject matter of any one or more of Examples 48-60 optionally include wherein the gesture includes at least one of a linear movement, a tapping movement, a sweeping movement, a minimum acceleration, or a minimum deceleration.

In Example 62, the subject matter of any one or more of Examples 48-61 optionally include wherein the audio effect includes Multidimensional Polyphonic Expression instructions for a musical instrument digital interface (MIDI) player.

Example 63 is a virtual drum set system comprising: a pair of drum sticks each including: a sensor to provide data based on movement of the drum stick; and a transceiver to transmit the sensor data; a device including a processor to: recognize a gesture from the sensor data; and determine, from the gesture, a visualization effect corresponding to the gesture and an audio effect including a drum sound corresponding to the gesture; and a display device to display the visualization effect; and a speaker to play the audio effect.

In Example 64, the subject matter of Example 63 optionally includes wherein the device is a mobile device.

In Example 65, the subject matter of any one or more of Examples 63-64 optionally include wherein the device further includes a device transceiver to receive the sensor data.

In Example 66, the subject matter of any one or more of Examples 63-65 optionally include wherein the display device is a virtual realty headset and the visualization effect includes a virtual drum set.

In Example 67, the subject matter of any one or more of Examples 63-66 optionally include wherein the sensor includes a nine-axis sensor including a magnetometer, an accelerometer, and a gyroscope.

In Example 68, the subject matter of any one or more of Examples 63-67 optionally include wherein the speaker includes headphones.

In Example 69, the subject matter of any one or more of Examples 63-68 optionally include wherein one of the pair of drum sticks is a parent drum stick and the transceiver of the parent drum stick is configured to receive child sensor data from the other of the pair of drum sticks and wherein the transceiver of the parent drum stick is to send combined sensor data to the device.

In Example 70, the subject matter of any one or more of Examples 63-69 optionally include wherein the sensor data includes data from sensors of both of the pair of drum sticks and wherein the gesture includes movement of the pair of drum sticks in coordination with each other.

In Example 71, the subject matter of any one or more of Examples 63-70 optionally include wherein the processor is to send timing information to the display device and the speaker to coordinate displaying the visualization effect and playing the audio effect.

In Example 72, the subject matter of any one or more of Examples 63-71 optionally include wherein the visualization effect corresponding to the gesture and the audio effect including the drum sound corresponding to the gesture are determined based on an orientation of the drum stick identified in the sensor data.

In Example 73, the subject matter of any one or more of Examples 63-72 optionally include wherein to determine the visualization effect, the processor is to determine the visualization effect based on a series of previously recognized gestures.

In Example 74, the subject matter of any one or more of Examples 63-73 optionally include wherein the system further comprises an additional sensor attached to an ankle or a foot of a user controlling the drum stick; and wherein the processor is further to determine, from the additional sensor data of the additional sensor, a second audio effect including a second drum sound corresponding to the second gesture.

In Example 75, the subject matter of Example 74 optionally includes wherein the speaker is to play the second audio effect.

In Example 76, the subject matter of any one or more of Examples 63-75 optionally include wherein the display device includes a plurality of wearable devices within a predetermined proximity of the drum stick, the visualization effect to be displayed at the plurality of wearable devices.

In Example 77, the subject matter of any one or more of Examples 63-76 optionally include wherein the gesture includes at least one of a linear movement, a tapping movement, a sweeping movement, a minimum acceleration, or a minimum deceleration.

In Example 78, the subject matter of any one or more of Examples 63-77 optionally include wherein the speaker is controlled by a musical instrument digital interface (MIDI) player and wherein the audio effect includes Multidimensional Polyphonic Expression instructions for use by the MIDI player.

Example 79 is a server in communication with a violin bow, the server comprising: a processor to: receive sensor data from a sensor of the violin bow, the sensor data based on movement of the violin bow; recognize a gesture from the sensor data; determine, from the gesture, a visualization effect corresponding to the gesture and an audio effect corresponding to the gesture; and cause the visualization effect and the audio effect to be output in response to the determination, the audio effect including a natural sound caused by the movement of the violin bow.

In Example 80, the subject matter of Example 79 optionally includes wherein to determine the visualization effect, the processor is to use a visualization engine.

In Example 81, the subject matter of any one or more of Examples 79-80 optionally include wherein to cause the visualization effect to be output, the processor is to send the visualization effect to a virtual reality headset of a user controlling the violin bow to be displayed on the virtual reality headset.

In Example 82, the subject matter of any one or more of Examples 79-81 optionally include wherein to cause the audio effect to be output, the processor is to send the audio effect to a speaker to play the audio effect.

In Example 83, the subject matter of Example 82 optionally includes wherein to cause the visualization effect to be output, the processor is to send the visualization effect to a display to be displayed in coordination with the audio effect played by the speaker.

In Example 84, the subject matter of any one or more of Examples 79-83 optionally include wherein the processor is further to receive data from the sensor indicating an initial position of the violin bow, and wherein to recognize the gesture, the processor is to determine a final position of the violin bow.

In Example 85, the subject matter of any one or more of Examples 79-84 optionally include wherein the visualization effect corresponding to the gesture and the audio effect corresponding to the gesture are determined based on an orientation of the violin bow identified in the sensor data.

In Example 86, the subject matter of any one or more of Examples 79-85 optionally include wherein to determine the visualization effect, the processor is to determine the visualization effect based on a series of previously recognized gestures.

In Example 87, the subject matter of any one or more of Examples 79-86 optionally include wherein the visualization effect includes a lighting effect, and wherein to cause the visualization effect to be output, the processor is to send the lighting effect to a plurality of wearable devices within a predetermined proximity of the violin bow to be displayed at the plurality of wearable devices.

In Example 88, the subject matter of any one or more of Examples 79-87 optionally include wherein the gesture includes at least one of a linear movement, a tapping movement, a sweeping movement, a minimum acceleration, or a minimum deceleration.

In Example 89, the subject matter of any one or more of Examples 79-88 optionally include wherein the audio effect includes Multidimensional Polyphonic Expression instructions for a musical instrument digital interface (MIDI) player.

Example 90 is a server in communication with a guitar pick, the server comprising: a processor to: receive sensor data from a sensor of guitar pick, the sensor data based on movement of the guitar pick; recognize a gesture from the sensor data; determine, from the gesture, a visualization effect corresponding to the gesture and an audio effect corresponding to the gesture; and cause the visualization effect and the audio effect to be output in response to the determination, the audio effect including a natural sound caused by the movement of the guitar pick.

In Example 91, the subject matter of Example 90 optionally includes wherein to determine the visualization effect, the processor is to use a visualization engine.

In Example 92, the subject matter of any one or more of Examples 90-91 optionally include wherein to cause the visualization effect to be output, the processor is to send the visualization effect to a virtual reality headset of a user controlling the guitar pick to be displayed on the virtual reality headset.

In Example 93, the subject matter of any one or more of Examples 90-92 optionally include wherein to cause the audio effect to be output, the processor is to send the audio effect to a speaker to play the audio effect.

In Example 94, the subject matter of Example 93 optionally includes wherein to cause the visualization effect to be output, the processor is to send the visualization effect to a display to be displayed in coordination with the audio effect played by the speaker.

In Example 95, the subject matter of any one or more of Examples 90-94 optionally include wherein the processor is further to receive data from the sensor indicating an initial position of the guitar pick, and wherein to recognize the gesture, the processor is to determine a final position of the guitar pick.

In Example 96, the subject matter of any one or more of Examples 90-95 optionally include wherein the visualization effect corresponding to the gesture and the audio effect corresponding to the gesture are determined based on an orientation of the guitar pick identified in the sensor data.

In Example 97, the subject matter of any one or more of Examples 90-96 optionally include wherein to determine the visualization effect, the processor is to determine the visualization effect based on a series of previously recognized gestures.

In Example 98, the subject matter of any one or more of Examples 90-97 optionally include wherein the visualization effect includes a lighting effect, and wherein to cause the visualization effect to be output, the processor is to send the lighting effect to a plurality of wearable devices within a predetermined proximity of the guitar pick to be displayed at the plurality of wearable devices.

In Example 99, the subject matter of any one or more of Examples 90-98 optionally include wherein the gesture includes at least one of a linear movement, a tapping movement, a sweeping movement, a minimum acceleration, or a minimum deceleration.

In Example 100, the subject matter of any one or more of Examples 90-99 optionally include wherein the audio effect includes Multidimensional Polyphonic Expression instructions for a musical instrument digital interface (MIDI) player.

Example 101 is a server in communication with a conductor baton, the server comprising: a processor to: receive sensor data from a sensor of the conductor baton, the sensor data based on movement of the conductor baton; recognize a gesture from the sensor data; determine, from the gesture, a visualization effect corresponding to the gesture and an audio effect corresponding to the gesture; and cause the visualization effect and the audio effect to be output in response to the determination, the audio effect to be played with corresponding natural sounds directed by the movement of the conductor baton.

In Example 102, the subject matter of Example 101 optionally includes wherein to determine the visualization effect, the processor is to use a visualization engine.

In Example 103, the subject matter of any one or more of Examples 101-102 optionally include wherein to cause the visualization effect to be output, the processor is to send the visualization effect to a virtual reality headset of a user controlling the conductor baton to be displayed on the virtual reality headset.

In Example 104, the subject matter of any one or more of Examples 101-103 optionally include wherein to cause the audio effect to be output, the processor is to send the audio effect to a speaker to play the audio effect.

In Example 105, the subject matter of Example 104 optionally includes wherein to cause the visualization effect to be output, the processor is to send the visualization effect to a display to be displayed in coordination with the audio effect played by the speaker.

In Example 106, the subject matter of any one or more of Examples 101-105 optionally include wherein the processor is further to receive data from the sensor indicating an initial position of the conductor baton, and wherein to recognize the gesture, the processor is to determine a final position of the conductor baton.

In Example 107, the subject matter of any one or more of Examples 101-106 optionally include wherein the visualization effect corresponding to the gesture and the audio effect corresponding to the gesture are determined based on an orientation of the conductor baton identified in the sensor data.

In Example 108, the subject matter of any one or more of Examples 101-107 optionally include wherein to determine the visualization effect, the processor is to determine the visualization effect based on a series of previously recognized gestures.

In Example 109, the subject matter of any one or more of Examples 101-108 optionally include wherein the visualization effect includes a lighting effect, and wherein to cause the visualization effect to be output, the processor is to send the lighting effect to a plurality of wearable devices within a predetermined proximity of the conductor baton to be displayed at the plurality of wearable devices.

In Example 110, the subject matter of any one or more of Examples 101-109 optionally include wherein the gesture includes at least one of a linear movement, a tapping movement, a sweeping movement, a minimum acceleration, or a minimum deceleration.

In Example 111, the subject matter of any one or more of Examples 101-110 optionally include wherein the audio effect includes Multidimensional Polyphonic Expression instructions for a musical instrument digital interface (MIDI) player.

Example 112 is at least one machine-readable medium including instructions, which when executed by a machine, cause the machine to perform operations of any of the operations of Examples 1-111.

Example 113 is an apparatus comprising means for performing any of the operations of Examples 1-111.

Example 114 is a system to perform the operations of any of the Examples 1-111.

Example 115 is a method to perform the operations of any of the Examples 1-111.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A server in communication with a pair of drum sticks, the server comprising:
   a processor to:
      receive sensor data from a sensor of at least one drum stick of the pair of drum sticks, the sensor data based on movement of the at least one drum stick;
      recognize a gesture from the sensor data;
      determine, from the gesture, a visualization effect corresponding to the gesture and an audio effect including a drum sound corresponding to the gesture; and
      cause the visualization effect and the audio effect to be output in response to the determination, wherein the visualization effect includes a virtual drum set and is output to a display to be displayed in coordination with the audio effect.

2. The server of claim 1, wherein to determine the visualization effect, the processor is to use a visualization engine.

3. The server of claim 1, wherein the sensor data includes data from sensors of both of the pair of drum sticks and wherein the gesture includes movement of the pair of drum sticks in coordination with each other.

4. The server of claim 1, wherein to cause the visualization effect to be output, the processor is to send the visualization effect to a virtual reality headset of a user controlling the pair of drum sticks to be displayed on the virtual reality headset.

5. The server of claim 1, wherein to cause the audio effect to be output, the processor is to send the audio effect to a speaker to play the audio effect.

6. The server of claim 1, wherein the output to the display includes captured video of a person performing the movement with the at least one drumstick.

7. The server of claim 1, wherein the processor is further to receive data from the sensor indicating an initial position of the at least one drum stick, and wherein to recognize the gesture, the processor is to determine a final position of the at least one drum stick.

8. The server of claim 7, wherein the drum sound is determined based on the initial position and the final position.

9. The server of claim 1, wherein the visualization effect corresponding to the gesture and the audio effect including the drum sound corresponding to the gesture are determined based on an orientation of the at least one drum stick identified in the sensor data.

10. The server of claim 1, wherein to determine the visualization effect, the processor is to determine the visualization effect based on a series of previously recognized gestures.

11. The server of claim 1, wherein the processor is further to:
   receive additional sensor data from a second sensor attached to an ankle or a foot of a user controlling the at least one drum stick;
   recognize a second gesture from the additional sensor data;
   determine, from the second gesture, a second audio effect including a second drum sound corresponding to the second gesture; and
   cause the second audio effect to be output with the visualization effect and the audio effect.

12. The server of claim 1, wherein the processor is further to:
   receive wearable sensor data from a plurality of wearable devices within a predetermined proximity of the at least one drum stick; and modify the visualization effect based on the wearable sensor data.

13. The server of claim 1, wherein the visualization effect includes a lighting effect, and wherein to cause the visualization effect to be output, the processor is to send the lighting effect to a plurality of wearable devices within a predetermined proximity of the at least one drum stick to be displayed at the plurality of wearable devices.

14. The server of claim 1, wherein the gesture includes at least one of a linear movement, a tapping movement, a sweeping movement, a minimum acceleration, or a minimum deceleration.

15. The server of claim 1, wherein the audio effect includes Multidimensional Polyphonic Expression instructions for a musical instrument digital interface (MIDI) player.

16. A method for providing effects corresponding to movement of drum sticks, the method comprising:
receiving sensor data from a sensor of at least one drum stick of a pair of drum sticks, the sensor data based on movement of the at least one drum stick;
recognizing a gesture from the sensor data;
determining, from the gesture, a visualization effect corresponding to the gesture and an audio effect including a drum sound corresponding to the gesture; and
causing the visualization effect and the audio effect to be output in response to the determination, wherein the visualization effect includes a virtual drum set and is output to a display to be displayed in coordination with the audio effect.

17. The method of claim 16, wherein determining the visualization effect includes using a visualization engine.

18. The method of claim 16, wherein the sensor data includes data from sensors of both of the pair of drum sticks and wherein the gesture includes movement of the pair of drum sticks in coordination with each other.

19. The method of claim 16, wherein causing the visualization effect to be output includes sending the visualization effect to a virtual reality headset of a user controlling the pair of drum sticks to be displayed on the virtual reality headset.

20. At least one non-transitory machine-readable medium including instructions for providing effects corresponding to movement of drum sticks, which when executed by a machine, cause the machine to:
receive sensor data from a sensor of at least one drum stick of a pair of drum sticks, the sensor data based on movement of the at least one drum stick;
recognize a gesture from the sensor data;
determine, from the gesture, a visualization effect corresponding to the gesture and an audio effect including a drum sound corresponding to the gesture; and
cause the visualization effect and the audio effect to be output in response to the determination, wherein the visualization effect includes a virtual drum set and is output to a display to be displayed in coordination with the audio effect.

21. The at least one non-transitory machine-readable medium of claim 20, further comprising instructions to:
receive wearable sensor data from a plurality of wearable devices within a predetermined proximity of the at least one drum stick; and
modify the visualization effect based on the wearable sensor data.

22. The at least one non-transitory machine-readable medium of claim 20, wherein the visualization effect includes a lighting effect, and wherein the instructions to cause the visualization effect to be output include instructions to send the lighting effect to a plurality of wearable devices within a predetermined proximity of the at least one drum stick to be displayed at the plurality of wearable devices.

23. A virtual drum set system comprising:
a pair of drum sticks each including:
a sensor to provide data based on movement of a drum stick of the pair of drum sticks; and
a transceiver to transmit the sensor data;
a device including a processor to:
recognize a gesture from the sensor data; and
determine, from the gesture, a visualization effect corresponding to the gesture and an audio effect including a drum sound corresponding to the gesture; and
a display device to display the visualization effect, wherein the visualization effect includes a virtual drum set and is output to a display to be displayed in coordination with the audio effect; and
a speaker to play the audio effect.

24. The virtual drum set system of claim 23, wherein the display device is a virtual realty headset and the visualization effect includes a virtual drum set.

25. The virtual drum set system of claim 23, wherein the sensor includes a nine-axis sensor including a magnetometer, an accelerometer, and a gyroscope.

* * * * *

UNITED STATES PATENT AND TRADEMARK OFFICE
CERTIFICATE OF CORRECTION

PATENT NO. : 10,102,835 B1  
APPLICATION NO. : 15/581957  
DATED : October 16, 2018  
INVENTOR(S) : Shah et al.

Page 1 of 1

It is certified that error appears in the above-identified patent and that said Letters Patent is hereby corrected as shown below:

On the Title Page

Item (22), in "Filed", in Column 1, Line 1, after "2017", insert --¶(65) Prior Publication Data US 2018/0315405 A1 Nov. 1, 2018--

Signed and Sealed this  
Sixth Day of August, 2019

Andrei Iancu  
*Director of the United States Patent and Trademark Office*